(12) United States Patent
Beukema et al.

(10) Patent No.: US 8,000,384 B2
(45) Date of Patent: Aug. 16, 2011

(54) APPARATUS FOR STABILIZING CONVERGENCE OF AN ADAPTIVE LINE EQUALIZER

(75) Inventors: Troy James Beukema, Briarcliff Manor, NY (US); William Richard Kelly, Verbank, NY (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 12/032,610

(22) Filed: Feb. 15, 2008

(65) Prior Publication Data

US 2009/0207900 A1    Aug. 20, 2009

(51) Int. Cl.
*H03K 5/159* (2006.01)
(52) U.S. Cl. ......................................... 375/232
(58) Field of Classification Search .......... 375/229–236, 375/142, 143, 150, 152, 343; 333/18, 28 R; 708/300, 322, 323, 5, 422, 813; 379/340, 379/398; 704/216, 218, 237, 263; 342/108, 342/145, 189, 378
See application file for complete search history.

(56) References Cited

U.S. PATENT DOCUMENTS

| | | | |
|---|---|---|---|
| 6,385,239 B1 * | 5/2002 | Okamoto et al. | 375/232 |
| 7,680,198 B2 * | 3/2010 | Ashish et al. | 375/260 |
| 2007/0258517 A1 * | 11/2007 | Rollings et al. | 375/233 |

* cited by examiner

*Primary Examiner* — Sam K Ahn
(74) *Attorney, Agent, or Firm* — Yee & Associates, P.C.; Anne V. Dougherty (57) ABSTRACT

Illustrative embodiments provide a computer implemented method and an apparatus for data decorrelation in a line equalizer adaptive system. The apparatus comprises an input and an output, forming a data path there between, wherein the input capable of receiving data to create received data and the output capable of sending data. The apparatus further comprises an adaptive equalizer capable of equalizing the received data, connected to the data path, and a synchronous decorrelator connected to the data path, in communication with the adaptive equalizer, wherein the synchronous decorrelator evaluates an adapt enable output for each received data input to the adaptive equalizer to determine whether the adaptive equalizer can update settings of the line equalizer adaptive system.

14 Claims, 6 Drawing Sheets

APPARATUS FOR STABILIZING CONVERGENCE OF AN ADAPTIVE LINE EQUALIZER

BACKGROUND OF THE INVENTION

1. Field of the Invention

The present invention relates generally to an improved data processing system, and in particular to an apparatus for stabilizing the convergence of an adaptive line equalizer in the presence of highly correlated line data.

2. Description of the Related Art

Adaptive line equalizers are used in modern serial input/output (I/O) links which interconnect high speed integrated circuit devices. These devices include network adapters, graphic adapters and central processors in current computing and networking systems. The line drivers and line receivers for these systems both may contain automatically adjusted, or adapted, line equalization capability. Adaptive equalization typically permits operation at data rates from 5 gigabits per second to 10 gigabits per second (Gb/s) and more. A serial I/O transceiver system employing an adaptive line equalization system may typically be used within a system to facilitate communication between many of the high speed components.

A typical application of adaptive equalization comprises a pair of transmitter and receiver devices comprising a continuous-time equalizer (CTE) and a decision-feedback equalizer (DFE) in the receiver, and a feed-forward equalizer (FFE) in the transmitter. Any combination of these equalizers may be adapted dynamically by an adaptive equalization process. In particular, high performance transceiver systems may employ continuous "blind" adaptive adjustment of these line equalizers. The equalizer settings of these transceiver systems are updated by examining payload data on the line rather than using a configured value.

BRIEF SUMMARY OF THE INVENTION

According to one embodiment of the present invention, an apparatus for data decorrelation in a line equalizer adaptive system is provided. The apparatus comprises an input and an output, forming a data path there between, wherein the input is capable of receiving data to create received data and the output is capable of sending data. The apparatus further comprises an adaptive equalizer connected to the data path for equalizing the received data, and a synchronous decorrelator connected to the data path, in communication with the adaptive equalizer, wherein the synchronous decorrelator evaluates an adapt enable output for each received data input to the adaptive equalizer to determine whether to update settings of the line equalizer adaptive system.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
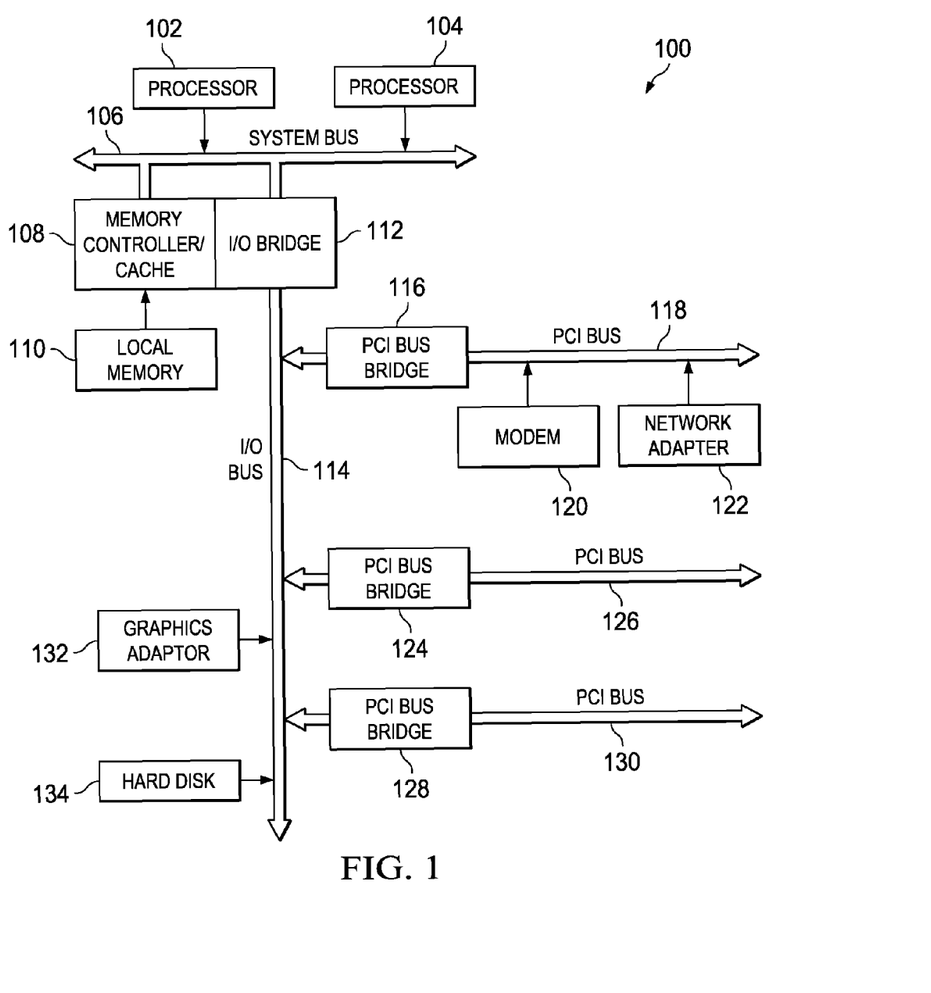
FIG. 1 is a block diagram of a data processing system, in accordance with illustrated embodiments.

Referring to FIG. 1, a block diagram of a data processing system is depicted in accordance with a preferred embodiment of the present invention. Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 110. I/O bridge 112 is connected to system bus 106 and provides an interface to I/O bus 114. Memory controller/cache 108 and I/O bridge 110 may be integrated as depicted.

Peripheral component interconnect (PCI) bus bridge 116 connected to I/O bus 114 provides an interface to PCI local bus bridge 116. A number of modems may be connected to PCI bus 118. Typical PCI bus implementations will support four PCI expansion slots or add-in connectors. Communications links to other systems may be provided through modem 120 and network adapter 122 connected to PCI bus 118 through add-in boards.

Additional PCI bus bridges 124 and 128 provide interfaces for additional PCI buses 126 and 130, from which additional modems or network adapters may be supported. In this manner, data processing system 100 allows connections to multiple network computers. A memory-mapped graphics adapter 132 and hard disk 134 may also be connected to I/O bus 114 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM® e-Server™ pSeries™ system, a product of International Business Machines Corporation in Armonk, N.Y., running the Advanced Interactive Executive (AIX®) operating system or LINUX™ operating system.

For example, in the data processing system 100 of FIG. 1, illustrated embodiment may be used in modern serial input/output (I/O) links which interconnect high speed integrated circuit devices. The high speed integrated circuit devices are typical of those found in network adapter 122, graphic adapter 132, and processors 102 and 104 in current computing and networking systems typical of data processing system 100. The serial links are typically chip to chip type connections or channels. Illustrated embodiments provide a capability to stabilize the convergence of an adaptive line equalization system, which may be employed in high speed serial line transceivers, in the presence of highly correlated line data to overcome problems associated with adaptive equalizer training. The problems are characterized by relatively high complexity, not able to detect or recognize short bursts of random data within long bursts of non-random data, and no protection against short repeat-pattern equalizer biasing. In one illustrated embodiment there is provided a configurable data conditioning system employing both a synchronous data decorrelator and an associated low entropy, or randomness estimator.

In one instance, illustrated embodiments permit operating configurations which allow start-up training of an adaptive line equalizer on highly correlated data sequences. Such sequences may be present in "legacy" serial I/O standards that do not employ data scrambling in the protocol and/or payload data transmissions. In a second instance, illustrated embodiments provide blocking of low entropy data sequences from the adaptive equalizer training system. The blocking mitigates degradation from data dependent bias effects which can occur during blind equalization from arbitrary line data.

The illustrated embodiments typically avoid the complexity associated with computation of accumulated data across correlations through synchronous decorrelation of data. Illustrative embodiments thereby may be used improve the data handling capability of the links between integrated circuit devices of data processing system 100.

Figure 2:
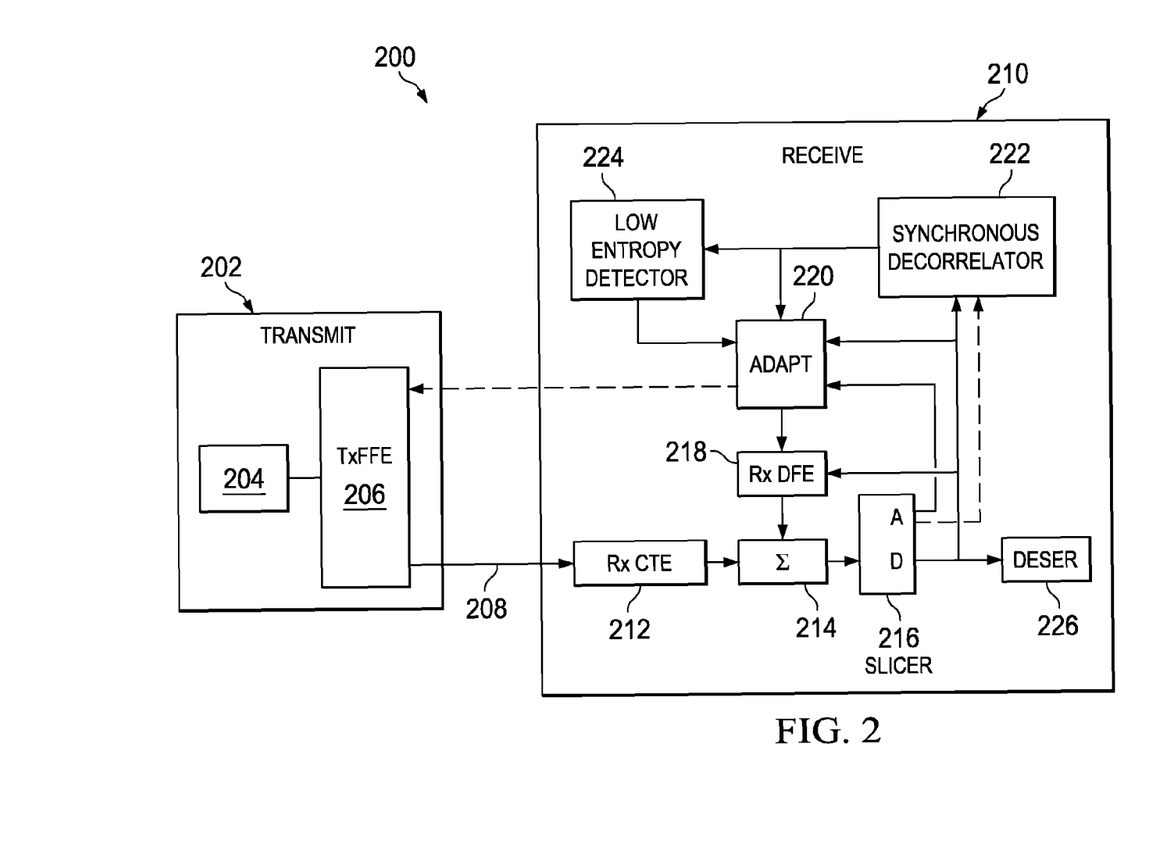
FIG. 2 is a block diagram of a transmitter and receiver pair with an adaptive line equalizer in accordance with illustrated embodiments.

With reference to FIG. 2, a block diagram of a transmitter and receiver pair with an adaptive line equalizer in accordance with illustrated embodiments is shown. A serial transceiver with adaptive equalizer may sample both the received data samples and an associated sample proportional to line distortion in a component known as a slicer block. The associated sample proportional to line distortion can be used to determine the inter-symbol interference (ISI) sign or level. This information is processed by a general adapt block to update equalization settings in the receiver decision feedback equalizer (DFE), receiver continuous time equalizer (CTE) of feed forward equalizer (FFE), and/or the transmitter feed forward equalizer using methods well established in the art, such as a simple and efficient sign-sign least mean square (LMS) adaptation.

To permit stable convergence of an adapted line equalizer, the data payload may not exhibit one hundred percent correlation among data bits used to determine the adaptive equalization settings. For example, a repeating pattern of bits "101010" has complete correlation of adjacent bits, and is therefore not usable to train an adaptive line equalizer. As a result, if a user payload contains bit pattern "101010" for a long period of time, an automatic equalizer training algorithm is required to pause continuous updating of adjustable line equalization circuitry during reception of the correlated data pattern.

Typical devices implementing modern serial standards operating at data rates in the 6 gigabits per second to 12 gigabits per second and above range employ line data scramblers to effectively remove the possibility of long sustained correlated data transmission payloads. Many legacy serial standards do not employ data scrambling. Thus, these standards may use a method, apparatus, or both to detect and pause adaptive line equalizer training when correlated data is being sent across the line.

Some serial standards may also employ start-up or link initialization preambles which are backward-compatible to legacy systems operating at lower data rates which do not employ data scrambling. Therefore, an adaptive line equalization system designed to continuously adapt based on arbitrary received data such as that including preamble components, payload components, idle fill components, and other components, must perform some analysis of the received data. The analysis is required to ensure that an adaptive line equalizer can be trained with a stable convergence point.

Correlated data patterns create different problems for adaptive line equalization. One problem is potential convergence instability, and another problem is potential biasing of the adaptive equalizer to unwanted, data-dependent convergence points. The convergence instability occurs when received data has one hundred percent correlation among the data history bits employed to adjust the adaptive equalization settings.

For example, correlation of the data bits associated with two or more different tap weights for a decision-feedback equalizer. In this case, the inter-symbol interference caused by the correlated data cannot be traced to one particular data bit. As a consequence no unique equalization setting for the decision-feedback equalizer tap weights can be found.

Convergence bias may also occur in adjustment of a line equalizer due to highly correlated received data. Older serial standards in particular may employ short repetitive patterns in idle fill sections, and un-scrambled data systems in general cannot guarantee that the line data will not contain short repeated data patterns. The occurrence of such short repeated data patterns can either bias an adapted line equalizer to unwanted data-dependent convergence or prohibit the adapted line equalizer from adapting completely.

One method to ensure that an adaptive line equalizer can converge computes the average cross correlation among all possible combinations of received data bits to adjust the adaptive equalizer settings, and block equalizer update if the correlation gets too high. For example, a decision-feedback equalizer with 5 feedback taps contains "C(5,2)=10" different unique data pair combinations. Each data pair must be cross correlated to determine if any data pair combinations are either completely correlated or have correlation which is too high to permit reliable convergence of the adaptive equalization. A disadvantage of this cross correlation approach is an increase in system complexity, particularly for equalization systems which adapt over a large range of data history, creating a large number of cross correlation pairs.

The approach of basing adaptive equalizer training enable settings on an average cross correlation metric may not permit short sections of random data embedded within otherwise long streams of correlated data to be used to update the equalizer training. The random data may go unnoticed. This problem can prohibit adaptive equalizer convergence on highly correlated data patterns which might be present in non-scrambled data systems.

Use of average data cross correlations as a metric to enable and disable equalizer training does not directly address the problem of potential equalizer bias from short repeat patterns. Short repeat patterns can often occur in non-scrambled line protocols. For example, a received data sequence could have zero correlation or extremely low average correlation across the equalizer data history, yet be transmitted repetitively in a short packet which can bias the adaptive equalizer convergence as a function of the data. The problems of using an averaged correlation based adaptive equalizer training enable method need to be addressed.

Adaptive line equalizer 200 implies a pair of transmitter and receiver devices. The line equalizers in the data path may include one or more of, but are not limited to, the following devices a transmitter feed forward equalizer, a receiver continuous time equalizer and a decision feedback equalizer, as commonly used. In this example transmitter 202 transmits data blocks to receiver 210. In a typical embodiment, the adaptive line equalizer may be applied as a high speed serial transceiver system comprising transmit and receive blocks that may function as high speed serializers, at the transmitter and as de-serializers at the receiver.

Transmitter 202 typically obtains parallel data that is serialized through serializer 204 and passed to transmitter 206. The data is sent through transmitter 206 having a feed forward equalizer (FFE) and over the link or channel 208 to receiver 210. Transmitter 206 may also have a feedback link from receiver 210.

Receiver 210 is comprised of a number of components dealing with receiving data and other components for dynamically adapting the line equalizer of the receiver. Receiver continuous time equalizer 212 receives input from transmitter 202. Modifier 214 receives data from continuous time equalizer 212 and feedback signals from receiver decision feedback equalizer 218. Data from modifier 214 is separated into a data portion and a signal portion by slicer 216.

Data output of slicer 216 is sent to receiver decision feedback equalizer 218, adapt block 220 and synchronous decorrelator 222. Signal output is sent on to receiver decision feedback equalizer 218, and adapt block 220. Synchronous decorrelator evaluates an "adapt enable" output for each new data input processed by adapt block 220. The adapt enable state of synchronous decorrelator 222 is further processed by low entropy detector 224. Low entropy detector 224 may be used in conjunction with synchronous decorrelator 222 to gate off adaptation in adapt block 220. This may be done to mitigate data dependent adaptation biased by short repeated data patterns in data channel 208.

The synchronous data decorrelator 222 accepts decoded data estimates from data slicing block slicer 216 and gates an adaptation enable signal to adapt block 220 on and off for each data sample processed. The data slicing block, slicer 216, produces estimates of the received data, represented by symbol "D" within slicer 216 and estimates of any signal(s) proportional to the distortion in the line, represented by symbol "A" in slicer 216, which feed the adapt block 220. Slicer 216 feeds adjusted data to de-serializer 226 for output.

Slicer 216 may be realized using conventional data slice latches, or analog to digital converters, which in turn feed known back-end digital signal processing algorithms to produce decoded data estimate "D" and signal(s) proportional to channel distortion "A". Adapt block 220 inputs data estimates "D" and any number of signals "A" which may provide channel distortion information and updates line equalizer training settings using any desired adaptation algorithm appropriate for the application. A typical training algorithm commonly employed in the art is the sign-sign least mean square method, which requires only a single sign bit for signal "A" which is proportional to the inter-symbol interference on the line and associated binary data samples "D" to adapt the line equalizers. Bit pair correlation may compute pir correlations directly from data "D" or combinations of data "D" and signal "A."

In operation, synchronous data decorrelator 222 processes the decoded data estimates, and on a sample-by-sample basis makes decisions whether adapt block 220 is enabled to make use of the instantaneous data sample "D" and distortion information "A" to update system equalizer settings. Synchronous decorrelator 222 asserts a binary signal "adapt enable" to a nominal value of "TRUE" or "1" if the data can be used to update the system line equalizer(s), and "FALSE" or "0" otherwise.

Synchronous data decorrelator 222 functions by evaluating instantaneous "single-bit" de-correlation between all combinations of received data bits over a desired history interval. Synchronous data decorrelator 222 determines whether there is one hundred percent, or complete, data correlation between any of the data bits. If all received data bits do not decorrelate, or change correlation sign at least once, over a short timeout period, synchronous decorrelator 222 sets an adaptation enable to FALSE and waits for the data to decorrelate. The waiting period may be controlled by a timeout counter.

During this wait period, the only received data which is allowed to enable adaptation is data which has not been previously decorrelated over the timeout period. In one illustrative embodiment, data sample history will cover the same range of equalization time covered by the adaptive equalizer (s). As an example, a decision feedback equalizer with "N" feedback bits will require a minimum "N" bit data history interval to be analyzed by synchronous decorrelator 222.

Apparatus to evaluate data de-correlations for a typical embodiment of a binary data receiver includes memory storage which holds the last single-bit correlation between each bit-pair combination of "N" elements taken two at a time. "N" in this case is the total number of data bits analyzed to update the system adaptive equalizers. A second memory storage value associated with each bit-pair combination is used to indicate if the sign of the instantaneous bit-pair correlations has changed, indicating decorrelated, at least once over a chosen timeout analysis interval.

For example, in the data processing system 100 of FIG. 1, an embodiment may be used in modern serial input/output (I/O) links which interconnect high speed integrated circuit devices. The high speed integrated circuit devices are typical of those found in network adapter 122, graphic adapter 132, and processors 102 and 104 in current computing and networking systems typical of data processing system 100. The serial links are typically chip to chip type connections or channels. Illustrated embodiments provide a capability to stabilize the convergence of an adaptive line equalization system, which may be employed in high speed serial line transceivers, in the presence of highly correlated line data to overcome problems associated with adaptive equalizer training. The problems are characterized by relatively high complexity, not able to detect or recognize short bursts of random data within long bursts of non-random data, and no protection against short repeat-pattern equalizer biasing. In one illustrated embodiment there is provided a configurable data conditioning system employing both a synchronous data decorrelator and an associated low entropy, or randomness estimator.

In one instance, an embodiment permits operating configurations which allow, start-up training of an adaptive line equalizer on highly correlated data sequences. Such sequences may be present in "legacy" serial I/O standards that do not employ data scrambling in the protocol and/or payload data transmissions. In a second instance, illustrated embodiments provide blocking of low entropy data sequences from the adaptive equalizer training system. The blocking mitigates degradation from data dependent bias effects which can occur during blind equalization from arbitrary line data.

Illustrative embodiments typically avoid the complexity associated with computation of accumulated data across correlations through synchronous decorrelation of data. Illustrative embodiments thereby may be used improve the data handling capability of the links between integrated circuit devices of data processing system 100.

Figure 3:
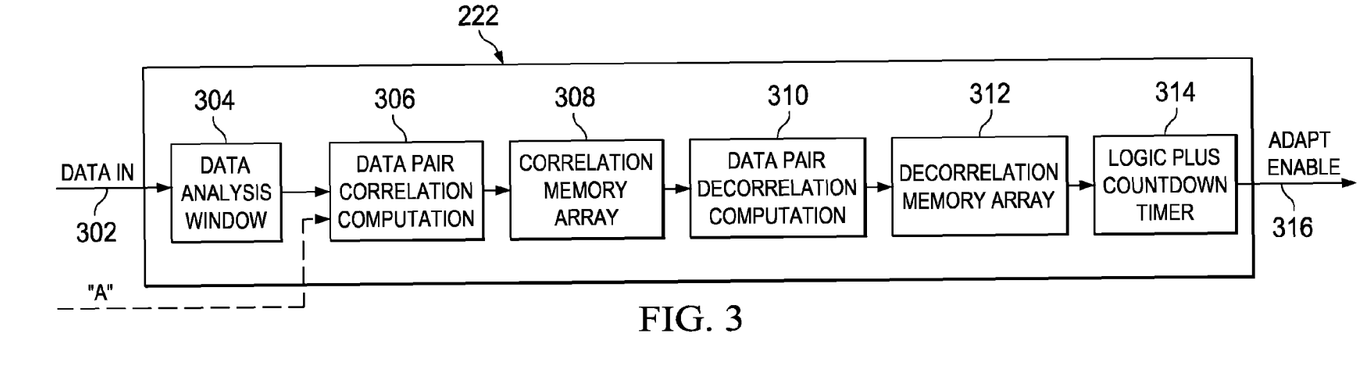
FIG. 3 is a block diagram of a synchronous decorrelator of the adaptive line equalizer of FIG. 2, in accordance with illustrated embodiments.

With reference to FIG. 3, a block diagram of synchronous decorrelator 222 of the adaptive line equalizer of FIG. 2, in accordance with illustrated embodiments is shown. Without loss of generality, a memory array indicating the previous instantaneous correlation between each data bit pair is correlation memory array 308. A memory array indicating the instantaneous correlation value which has toggled, at least once, since the start of a timeout interval is decorrelation memory array 312. In this example of a binary data receiver system, these memory arrays are 1-bit arrays which hold a value of "1" or "0".

The arrays are indexed by a fixed, but arbitrary, assignment of all possible data bit-pair combinations for the data analysis window 304 history "N". For example, when the value of "N" is 3, there are a total of C(3,2)=3 different bit-pair combinations. The combinations may then be arbitrarily indexed as "0" for bit pair (1,2), "1" for bit pair (2,3) and "2" for bit pair (1,3). The bit-pair index may be considered part of data analysis window 304.

The data analysis window has an associated size, wherein the size may be predetermined, selectable by a user or automatically set. If the data analysis window is predetermined the size is fixed. If the size is selected by a user, based on previous results or a calculation, the sizing may be input by command, or other user interface. When the window size is set automatically or programmatically, the size may be adjusted according to the run time results obtained. When set programmatically the sizing may be viewed as adapting to the requirements of the data being analyzed.

In this example, the correlation memory array 308 and decorrelation memory array 312 memory registers are 3 bits long and indexed according to the bit combinations shown. The correlation memory array 308 is updated once per new data input 302. Data pair correlation computation block 306 determines the correlation between each bit pair combination in data analysis window 304 when a new data are input to synchronous decorrelator 222. Any method capable of determining this correlation may be employed, including but, not limited to, direct analysis of data analysis window 304 contents.

Analysis of combinations of the data analysis window with any other information, such as signal "A" input to data pair correlation computation 306, may be performed provided the result is capable of producing a unique bit pair correlation result. This option provides a capability of deriving bit pair correlation computations from both data "D" input and signal "A" input. The bit pair correlations are compared with correlations computed during the previous data analysis by data pair decorrelation computation 310. The logic of data pair decorrelation computation 310 asserts a nominal "1" or "true" value for bit pair combinations which have changed correlation sign due to the new data input. This decorrelation computation can be achieved using any method or apparatus capable of uniquely determining if the bit pair correlation has changed sign. For example, a simple and efficient "exclusive or" gate structure may be employed. The results of data pair decorrelation computation 310 are stored in decorrelation memory array 312. In this example, decorrelation memory array 312 comprises a register of binary values of length equal to the number of data pair combinations in the data analysis window.

When a timeout period is reached without seeing at least one decorrelation, or change in sign between the correlation of all bit combinations, control logic of logic plus countdown timer 314 halts equalizer adaptation by asserting signal adapt enable 316 "low". The system waits for a timeout period for the bit pair combinations which have not yet changed sign to change sign, or decorrelate. When a given data pair changes correlation sign for the first time due to a new data input 302, the equalizer is updated on the data which produced the correlation sign change by asserting signal adapt enable 316 "high" for data input 302. After a change in sign of the correlation of all data pairs is found. This situation means all data pairs were decorrelated at least once, and a timeout period counter within control logic of logic plus countdown timer 314 is reset. Further, the sign-change memory array of decorrelation memory array 312 is cleared to "0", and the search for change in sign of all data pair combinations is performed again.

Figure 4A:
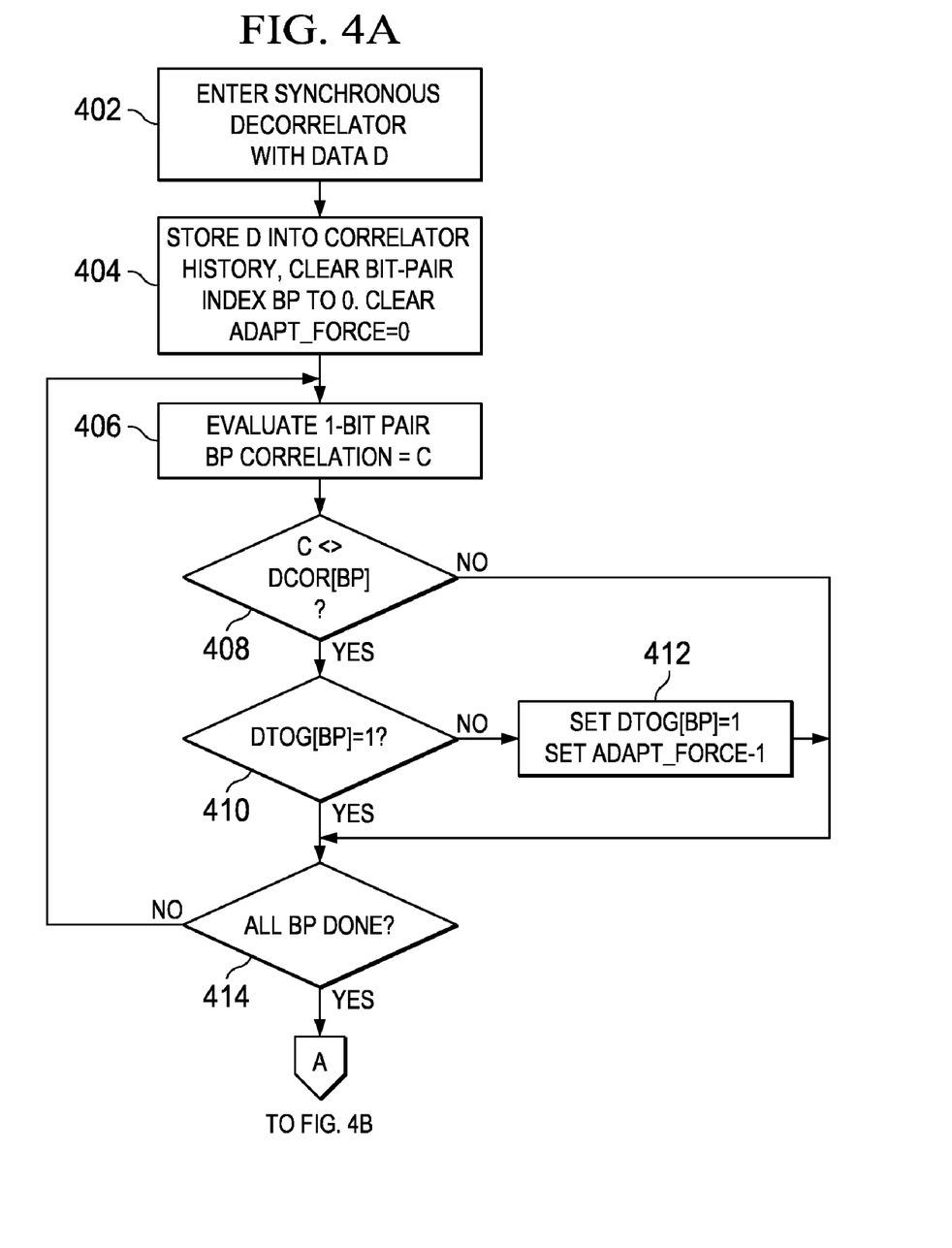
FIG. 4 is a flowchart of a synchronous decorrelation process, in accordance with illustrated embodiments.
Figure 4B:
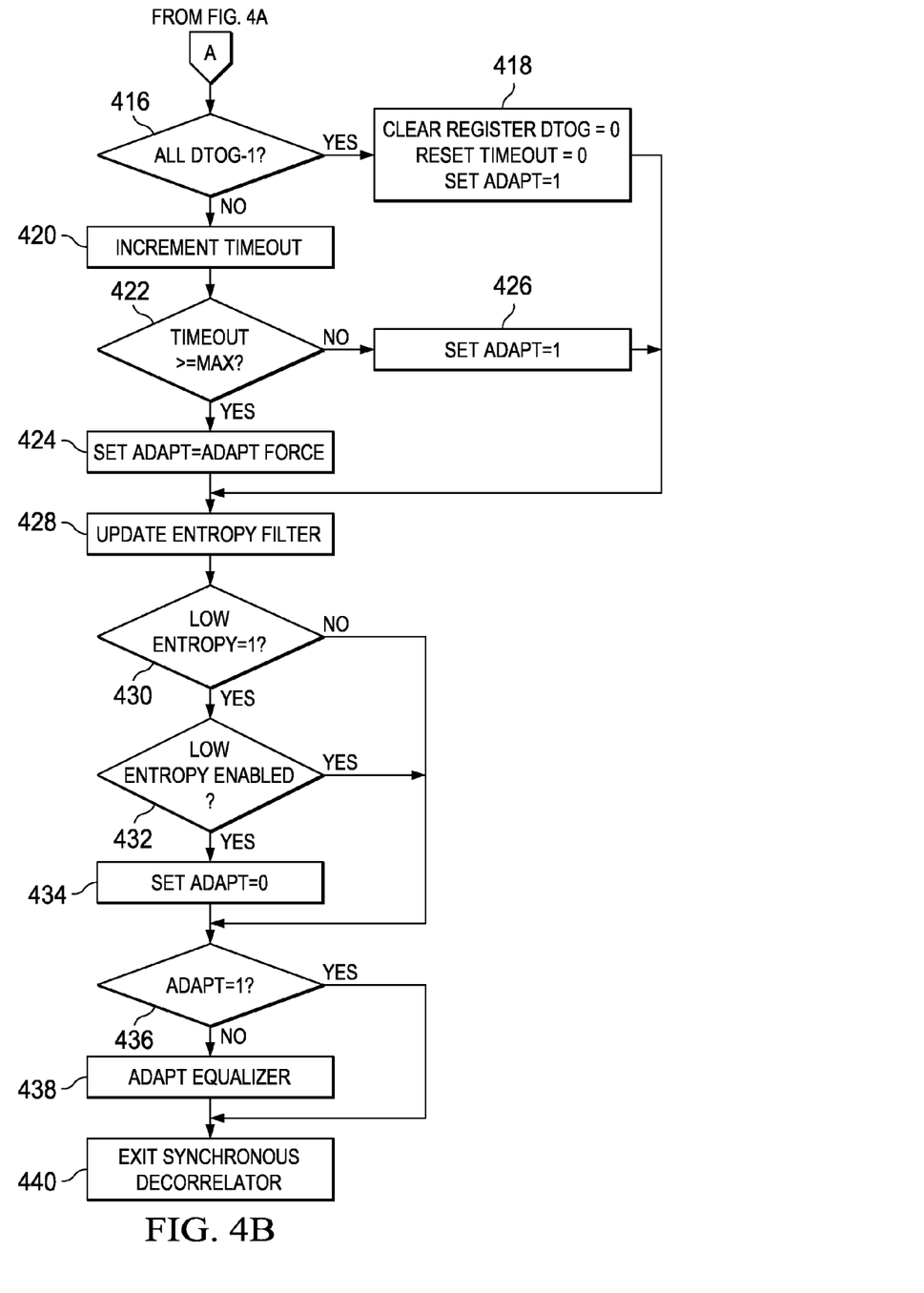

With reference to FIG. 4, a flowchart of synchronous decorrelation process, in accordance with illustrated embodiments, is shown. In this example, a typical sequence of power up reset followed by the steps of adaptive line equalization process 400 implemented by synchronous decorrelator 222 of FIG. 2 is depicted.

Process 400 begins with entry to synchronous decorrelator 222 of FIG. 2 of data "D" (step 402). Data "D," of length "N," is stored in a correlator history of data analysis window array memory, the bit-pair index is cleared to all 0, a control signal ADAPT_FORCE is cleared to 0 and logic plus timeout counter is cleared to all 0 (step 404).

For all C(N,2) bit pairs "BP" the correlation is evaluated (+1 or −1) between data pair "BP" (step 406). A determination is made whether the data pair correlation is different from the previous correlation (step 408). If there is a difference in the data pair correlation, a "yes" result is obtained. If there was no difference in the data pair correlation, a "no" result is obtained in step 408. When a "yes" is obtained in step 408 the correlation memory array is updated for the data pair to the new correlation value (step 409). A determination is made whether the value of the decorrelation memory array for data pair "BP" is currently "1" (step 410). If the value of the decorrelation memory array is not "1", the result of step 410 is "no"; then a signal ADAPT_FORCE is set to 1 and the decorrelation memory array is set to 1 for the data pair (step 412). If the value of decorrelation memory array for data pair is 1, a "yes" in step 410, the process proceeds to determine whether there are more bit pairs to process (step 414). If a "no" was obtained in step 408, process 400 skips to step 414 to determine whether there are more bit pairs to process.

If there are no more bit pairs to process a "no" is obtained in step 414, otherwise bit pairs are available to process and a "yes" is obtained. When a "no" is obtained process 400 returns to step 406. When a "yes" is obtained, a determination is made whether all decorrelation memory array values are 1 (step 416). If the values are 1, a "yes" results otherwise a "no" is obtained. If a "yes" is obtained in step 416, set a signal ADAPT=1, clear timeout and decorrelation memory array to 0 (step 418) and proceed to step 428.

If a "no" was obtained in step 416, increment timeout counter in logic plus countdown timer (step 420) and determine whether the timeout counter is greater than or equal to a maximum value (step 422). If the timeout counter is not greater than or equal to a maximum value, a "no" results and set Adapt=1 is performed (step 426). If the timeout counter is greater than or equal to a maximum value, a "yes" results and a set Adapt=Adapt_Force is performed (step 424).

Update the low entropy detector by filtering the Adapt signal to produce a binary "low entropy" true/false estimate (step 428). Determine whether the low entropy value is 1 (step 430). If the low entropy value is 1, a "yes" results otherwise a "no" is obtained. When a "yes" is obtained in step 430, a determination is made whether low entropy is enabled (step 432). When low entropy is enabled, a "yes" results otherwise a "no" is obtained. When a "yes" is obtained in step 432, a set Adapt=0 is performed in step 434 and process 400 proceeds to step 436. When a no is obtained in steps 430 or 432, process 400 moves to step 436.

A determination is made whether Adapt=1 (step 436). When Adapt=1 a "yes" is obtained otherwise a "no" results. When "yes" is obtained in step 436, the equalizer is adapted for data "D" (step 438) then exit synchronous decorrelator thereafter (step 440). When a "no" is obtained in step 436, process 400 skips adapt equalizer step 438 and exits synchronous decorrelator thereafter (step 440).

Illustrative embodiments typically eliminate need for high precision correlation accumulators for each data pair combination across the desired data span history "N". Using the exemplary approach, only two state bits, correlation memory array and decorrelation memory array are needed for each data pair combination. Further, the logic required to update these bits is of low complexity, thereby typically avoiding the need for summers and sign multipliers to compute data cross correlations as is typically done in a method employing average cross correlation computations.

By way of example, this method, which can be viewed as a data decorrelation method as opposed to a data correlation threshold method, may more efficiently determine data correlation among the data bits used to train the adaptive equalizer is less than a given threshold, in particular, less than 1, or one hundred percent correlated, which is an instability point. Since the data correlation may be determined to be less than 1 by the method, a stable equalizer convergence point is made possible, without explicitly computing any long term averaged data correlations.

A maximum data correlation allowed by the method is proportional to the length of the timeout period during which adaptation is enabled independent of the state of the data de-correlations. The timeout value in the decorrelator block can be predetermined, user programmable or automatically calculated as required. In one example, the timeout value may be determined previously and set or hardwired. In another example a user may provide a timeout value based on a calculation or previous usage, by command or other interface. In yet another example, the timeout value may be determined automatically or programmatically based on the data being equalized during run time. Use of long timeout periods permits higher correlation and faster adaptation rate. Use of short timeout periods, including the possibility of immediate timeout, or a timeout interval length of 0, lowers the maximum data correlation permitted while slowing down the adaptation rate.

When the timeout period is reduced, the probability that adaptation will be blocked before all data across the adaptation data history interval decorrelates increases. For example a timeout value of eight equalizer adaptation updates is used in an illustrative embodiment. This selected timeout value provides a maximum long-term average correlation, among data bits decorrelated, to be small enough to enable practical adaptive equalization convergence.

In another example, using the synchronous decorrelator provides the ability to extract short bursts of random data from among otherwise dominant highly correlated data. This capability enables the training of equalizers on highly repetitive transmit patterns. The highly repetitive patterns can occur in non-scrambled systems, particularly pre-amble training sequences for older standards. The older standards require equalizers to provide backward compatible support in addition with newer serial standards which otherwise employ data scrambling to maintain low data correlation on the line. Even if such a data pattern exhibits relatively high average correlation among data pairs within the adaptation data history analysis interval, the synchronous decorrelator can selectively respond to short periods of decorrelated data to enable adaptation on the highly correlated data.

In some cases, it may not be desirable to enable the adaptive equalizer to make use of short bursts of non random data in otherwise dominantly correlated data. In these cases use of the highly correlated data may induce unwanted data-dependent bias on the equalizer convergence point. To control enabling of the equalizer, a "low entropy" filter 224, of FIG. 2, is added on the output of the adapt enable status generated by synchronous decorrelator 222 also of FIG. 2. The low entropy filter produces a "filtered" adapt enable signal which can be used to gate equalizer training off even if the synchronous decorrelator would enable training.

In an illustrative embodiment, low entropy filter 224 of FIG. 2 is realized using a simple limiting integrator. Without loss of generality, the limiting integrator can be represented as a state variable, commonly represented as a signed or unsigned integer value. In this example, the limiting integrator state, or current value, is referred to symbolically as entropy. It is understood that the use of the term entropy here is general, and it is not intended to refer to any specific definition such as information theoretic entropy of a data stream. The low entropy filter works by increasing the entropy value toward a maximum limit if synchronous decorrelator 222, of FIG. 2, would enable adaptation, where ADAPT=1 on a new data input, and decreasing the entropy value toward a minimum limit if the synchronous decorrelator would disable adaptation, where ADAPT=0, on a new data input. In this example, the current value of the entropy filter state is compared against an arbitrary threshold, and if the state is below this threshold, the "low entropy" filter asserts a value TRUE. This "low entropy" assertion can be used to block adaptive equalizer updates, if enabled, by programmable configuration. The threshold value may be a predetermined value, a user programmable value or an automatically set value. If predetermined, the value is fixed or set. When established by a user programmable value, the value may be calculated or obtained from reviewing previous results. When set automatically or programmatically, the value may be adjusted based on previous results obtained for the filter. The following descriptive text outlines operation of the simple limiting integrator "low entropy" filter.

Figure 5:
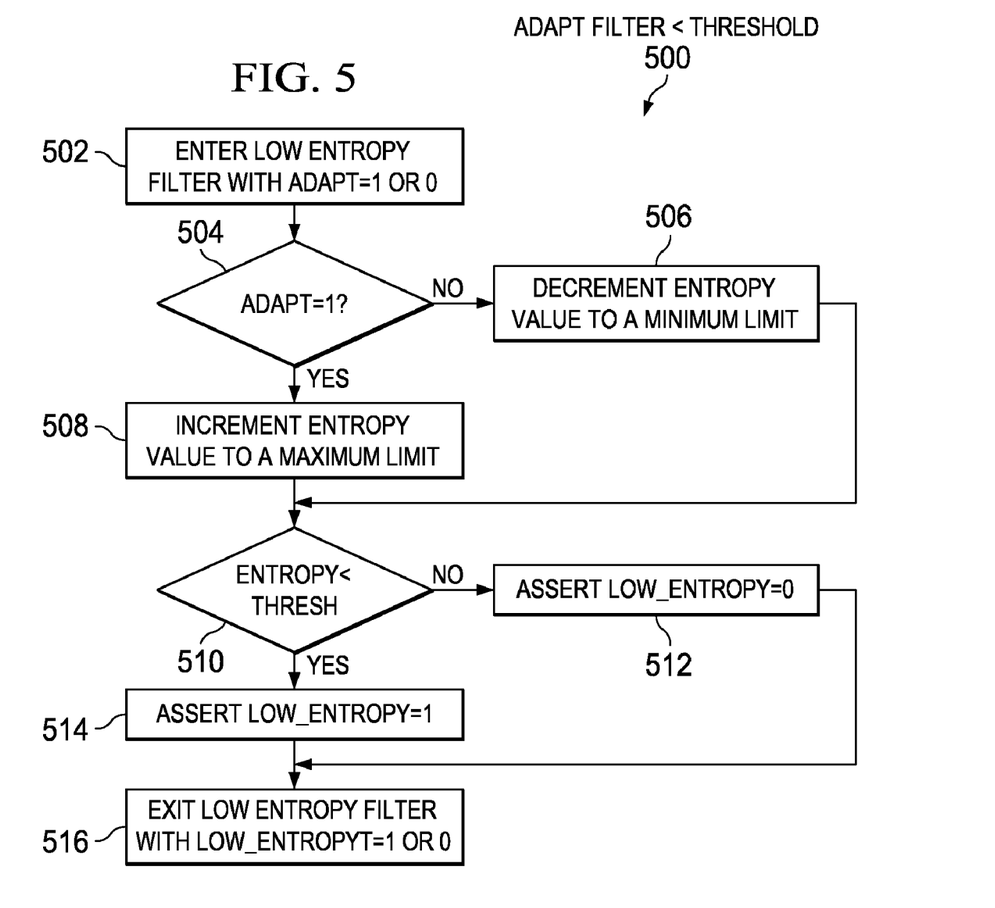
FIG. 5 is a flowchart of a low entropy filter which may be used in conjunction with the synchronous decorrelation process of FIG. 4.

With reference to FIG. 5 is a flowchart of a low entropy filter used within the adaptive equalization process of FIG. 4. Low entropy filter process 500 is an example of use of low entropy detector 224 of FIG. 2 to filter the Adapt state output from synchronous decorrelator 222 of FIG. 2.

Process 500 begins with entry to the low entropy filter with an Adapt value of 1 or 0 obtained from the synchronous decorrelator (step 502). A determination is made whether the Adapt value is equal to 1 (step 504). If the value is 1, a "yes" results otherwise a "no" is obtained. When a "no" is obtained in step 504, the entropy value is decreased to a minimum value (step 506). If a "yes" was obtained in step 504, the entropy value is incremented to a maximum (step 508).

A determination is made whether the filtered Adapt value, or entropy, is less than a threshold value (step 510). If the value is less, a "yes" results otherwise a "no" is obtained.

When the result of step 510 is a "no," a low entropy=0 is asserted (step 512) with process 500 terminating thereafter (step 516). When a "yes" is obtained in step 510, a low entropy=1 is asserted (step 514) with process 500 terminating thereafter (step 516).

In this example, using the low entropy filter typically mitigates degradation from possible adaptation bias. Such bias can arise from short repetition patterns in data which may not be one hundred percent correlated, but can still bias the convergence point of an adaptive equalizer. A typical application of an illustrative embodiment for example is when a serial data standard with a highly correlated start-up training pattern would disable the entropy detector integration block, or ignore the LOW_ENTROPY signal from the low entropy filter, on initial training to permit coarse training of the equalizer on the highly correlated and/or repetitive training pattern, then enable the low entropy detector to block adaptive equalization thereafter.

Illustrative embodiments provide a synchronous decorrelator logic structure which requires two bits of storage per data pair combination across a desired data decorrelation analysis window. The synchronous decorrelator offers efficiencies, such as, avoiding a large array of correlation accumulators and adders or sign changers to compute the precision averaged correlations. The synchronous decorrelator provides a capability to extract small sections of random data from among otherwise highly correlated data sequences. This enables adaptive equalization updates to execute rather than analyzing for high correlation and stopping the equalizer adaptation. Further, a capability is provided to block highly correlated sequences even if they contain short pieces of random data to reduce unwanted bias effects on adaptation convergence.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multi-chip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for data decorrelation in a line equalizer adaptive system, the apparatus comprising:
    an input and an output, forming a data path therebetween, wherein the input is capable of receiving data to create received data and the output is capable of sending data;
    an adaptive equalizer for equalizing the received data, connected to the data path;
    a synchronous decorrelator connected to the data path, in communication with the adaptive equalizer, wherein the synchronous decorrelator evaluates an adapt enable output for each received data input to the adaptive equalizer to determine whether to update the adaptive equalizer settings of the line equalizer adaptive system; and
    a low entropy detector connected to the adaptive equalizer and the synchronous decorrelator, wherein the low entropy detector filters the adapt enable output of synchronous decorrelator.

2. The apparatus for data decorrelation of claim 1, wherein the low entropy detector further comprises:
    a filter for adjusting an adapt filter state based on the adapt enable output of the synchronous decorrelator;
    a comparator for comparing the adapt filter state with a threshold;
    a generator for generating an assertion, the assertion used to block adaptive equalizer updates.

3. The apparatus for data decorrelation of claim 1 wherein the synchronous decorrelator further comprises:
    a data analysis window connected to the data path, the data analysis window containing the received data comprising data bit pairs;

a data pair correlation computation connected to the data path, the data pair correlation computation determining a correlation between each of the data bit pairs in the data analysis window;

a correlation memory array connected to the data path, the correlation memory array containing a previous instantaneous correlation between each of the data bit pairs;

a data pair decorrelation computation connected to the data path, the data pair decorrelation computation comparing each bit pair correlation with a previous correlation;

a decorrelation memory array connected to the data path, the decorrelation memory array containing an indication an instantaneous correlation value has toggled at least once; and a logic plus countdown timer connected to the data path, the logic plus countdown timer containing control logic and a countdown timer, wherein the logic plus countdown timer capable of controlling equalizer adaptation by asserting an adapt enable signal to the output.

4. The apparatus for data decorrelation of claim 3 wherein the data analysis window is sized by one of a predetermined size, a user selectable size and a programmatically determined size.

5. The apparatus for data decorrelation of claim 3 wherein the countdown timer further comprises:
a countdown timer value as determined by one of a predetermined value, a user selectable value and a programmatically determined value.

6. The apparatus for data decorrelation of claim 1 wherein the input is connected to a transmitter, and the adaptive equalizer is connected to the transmitter, wherein the adaptive equalizer provides an adapt signal to the transmitter.

7. A method for data decorrelation in a line equalizer adaptive system, the method comprising the steps of:
receiving new data into an adaptive equalizer to create received data, wherein receiving the new data into the adaptive equalizer comprises:
receiving new data into a history memory array;
clearing a control signal to zero; and
pairing data bits of the new data by pairing each bit with each other bit to form bit pairs;
splitting the received data into a signal component and a data component;
analyzing the data component in a synchronous decorrelator to determine a correlation; and
responsive to determining a correlation, adapting the equalizer for the new data.

8. The method for data decorrelation in a line equalizer adaptive system of claim 7, wherein the analyzing the data component in a synchronous decorrelator to determine a correlation further comprises the steps of:
evaluating a correlation between the bit pairs to create a new correlation value;
determining whether the new correlation value differs from a previous correlation value;
responsive to determining a difference, determining whether a decorrelation memory array has a zero value, and responsive to determining a zero value asserting a first signal to one and asserting decorrelation memory array for the bit pair to one; and
responsive to determining the difference, updating a correlation memory array bit pair value to the new correlation value.

9. The method for data decorrelation in a line equalizer adaptive system of claim 7, wherein the adapting the equalizer for the new data, further comprises the steps of:

determining whether the decorrelation memory array has values of all 1s;
responsive to determining that the decorrelation memory array contains values of all 1s, setting a second signal to 1 and clearing a timeout counter;
responsive to determining that the decorrelation memory array contains values other than all 1s, incrementing the timeout counter;
determining whether the timeout counter includes a count that is greater than or equal to a maximum value;
responsive to determining the timeout counter includes a count that is greater than or equal to a maximum value, setting the second signal to 0;
determining whether the first signal is set to 1;
responsive to determining that the first signal is set to 1, setting the second signal to 1;
determining whether the second signal is 1; and
responsive to determining that the second signal is 1, adapting the equalizer for the new data.

10. The method for data decorrelation in a line equalizer adaptive system of claim 7, wherein the history memory array is a data analysis window; the data analysis window being one of a predetermined size, a user selectable size and a programmatically determined size.

11. The method for data decorrelation in a line equalizer adaptive system of claim 9, wherein responsive to determining the first signal is set to one, setting the second signal to one, further comprises the steps of:
filtering the second signal to produce a binary low entropy estimate;
determining whether low entropy is true and low entropy block is enabled; and
responsive to determining low entropy is true and low entropy block is enabled, setting second signal to zero.

12. The method for data decorrelation in a line equalizer adaptive system of claim 9, wherein the maximum value is one of a predetermined value, a user selectable value and a programmatically determined value.

13. The method for data decorrelation in a line equalizer adaptive system of claim 9, wherein the filtering the second signal to produce a binary low entropy estimate further comprises setting a low entropy detect filter to one of a predetermined value, a user selectable value or a programmatically determined value.

14. A method for data decorrelation in a line equalizer adaptive system, the method comprising the steps of:
receiving new data into a history memory array;
clearing a control signal to 0;
pairing data bits of the new data by pairing each bit with each other bit to form bit pairs;
evaluating a correlation between the bit pairs to create a new correlation value;
determining whether the new correlation value differs from a previous correlation value;
responsive to determining a difference, determining whether a decorrelation memory array has a zero value, and responsive to determining the decorrelation memory array contains a zero value asserting a first signal to 1 and setting the decorrelation memory array for the bit pair to 1;
responsive to determining the difference, updating a correlation memory array bit pair value to the new correlation value;
determining whether the decorrelation memory array has values of all 1s;

responsive to determining that the decorrelation memory array contains values of all 1s, setting a second signal to 1 and clearing a timeout counter;

responsive to determining that the decorrelation memory array contains values other than all 1s, incrementing the timeout counter;

determining whether the timeout counter contains a count that is greater than or equal to a maximum value;

responsive to determining that the timeout counter contains a count that is greater than or equal to a maximum value, setting the second signal to 0;

determining whether the first signal is set to 1;

responsive to determining that the first signal is set to 1, setting the second signal to 1;

filtering the second signal to produce a binary low entropy estimate;

determining whether the binary low entropy estimate is true and a low entropy block is enabled;

responsive to determining that the binary low entropy estimate is true and the low entropy block is enabled, setting the second signal to 0;

determining whether the second signal is 1; and responsive to determining the second signal is 1, adapting the equalizer for the new data.

* * * * *